United States Patent [19]

Tanaka et al.

[11] Patent Number: 4,682,860
[45] Date of Patent: Jul. 28, 1987

[54] ULTRASMALL SIZE ZOOM LENS

[75] Inventors: Kazuo Tanaka, Tokyo; Akira Tajima, Kanagawa, both of Japan

[73] Assignee: Canon Kabushiki Kaisha, Tokyo, Japan

[21] Appl. No.: 699,026

[22] Filed: Feb. 7, 1985

Related U.S. Application Data

[63] Continuation of Ser. No. 381,463, May 24, 1982, abandoned, and a continuation-in-part of Ser. No. 550,998, Nov. 10, 1983, abandoned, which is a continuation of Ser. No. 243,209, Mar. 12, 1981, abandoned.

[30] Foreign Application Priority Data

Mar. 14, 1980 [JP] Japan .................................. 55-32524
Jun. 4, 1981 [JP] Japan .................................. 56-86188

[51] Int. Cl.$^4$ ......................... G02B 9/64; G02B 15/14
[52] U.S. Cl. ...................................... 350/423; 350/426
[58] Field of Search ............................... 350/423, 426

[56] References Cited

U.S. PATENT DOCUMENTS

| | | | |
|---|---|---|---|
| 2,752,821 | 7/1956 | Cook ................................ | 350/465 |
| 4,155,629 | 5/1979 | Nakamura ......................... | 350/426 |
| 4,323,302 | 4/1982 | Kimura ............................. | 350/426 |

OTHER PUBLICATIONS

Jenkins et al, *Fundamentals of Optics*, 3rd Ed., pp. 144–145.

*Primary Examiner*—John K. Corbin
*Assistant Examiner*—Rebecca D. Gass
*Attorney, Agent, or Firm*—Toren, McGeady & Associates

[57] ABSTRACT

An ultrasmall size zoom lens comprising two lens groups of which the first has a positive refractive power and the second has a negative refractive power, the first lens group including at least two positive lenses and at least one negative lens, the second group including at least one positive lens and at least one negative lens, and the axial air separation between the first and the second lens groups being variable to effect zooming.

8 Claims, 42 Drawing Figures

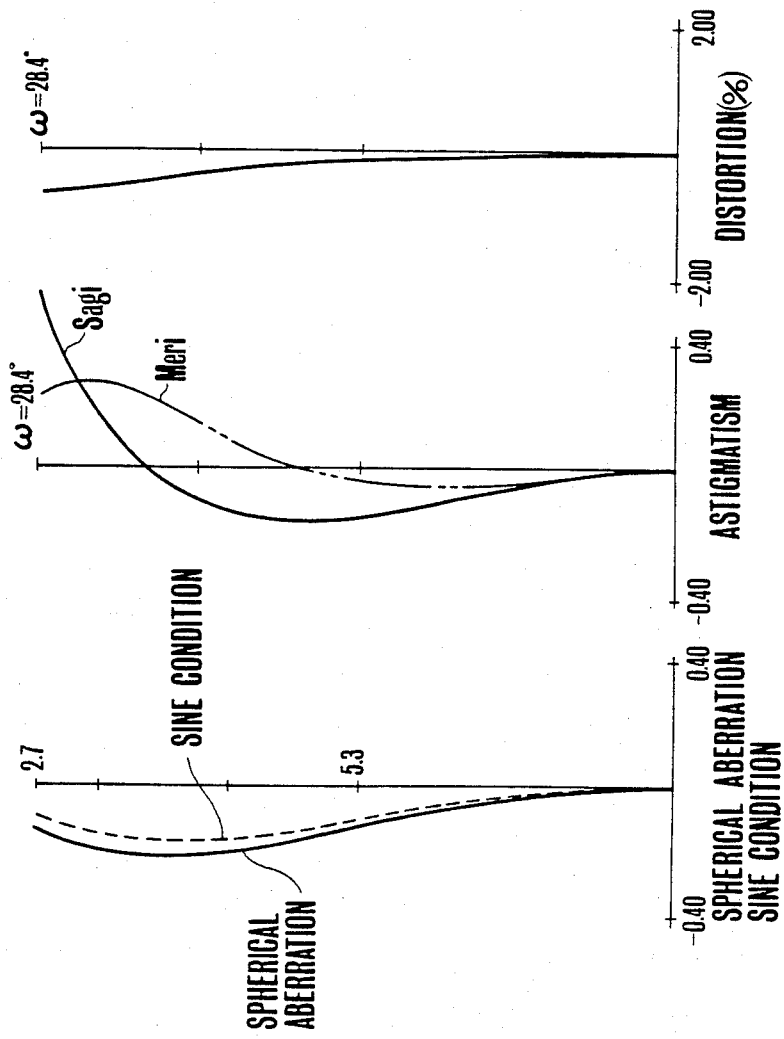

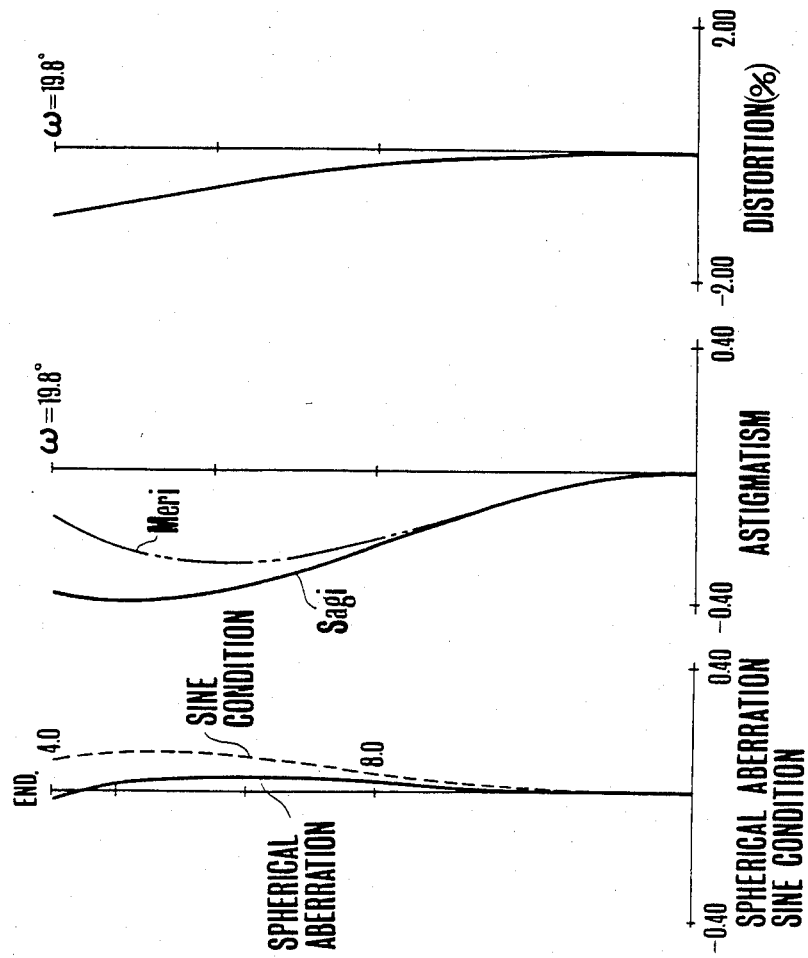

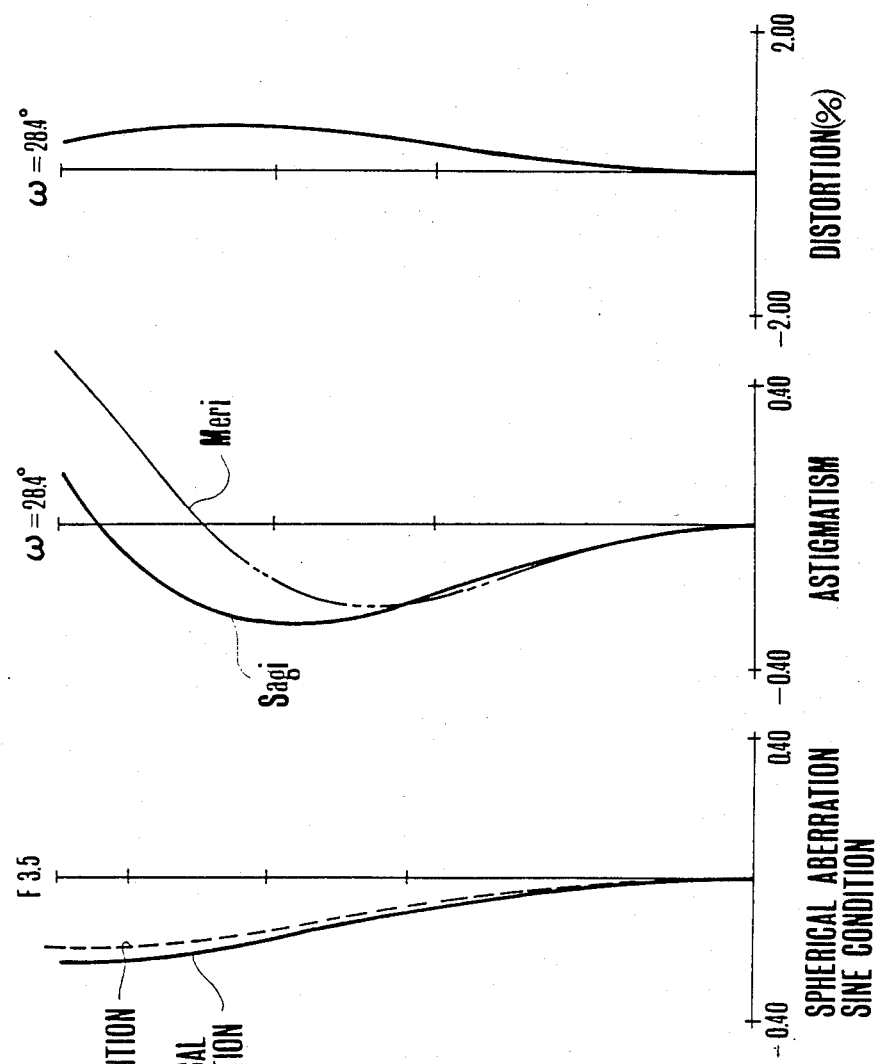

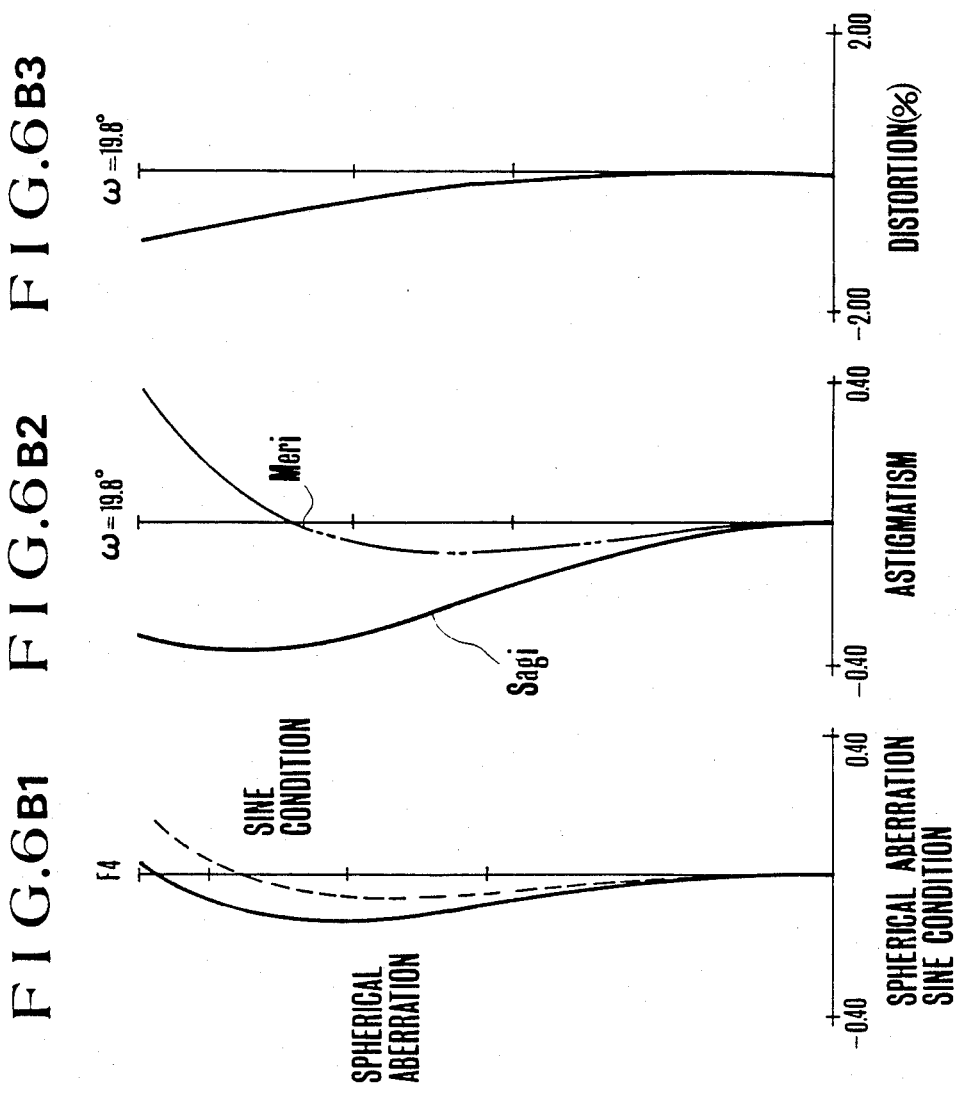

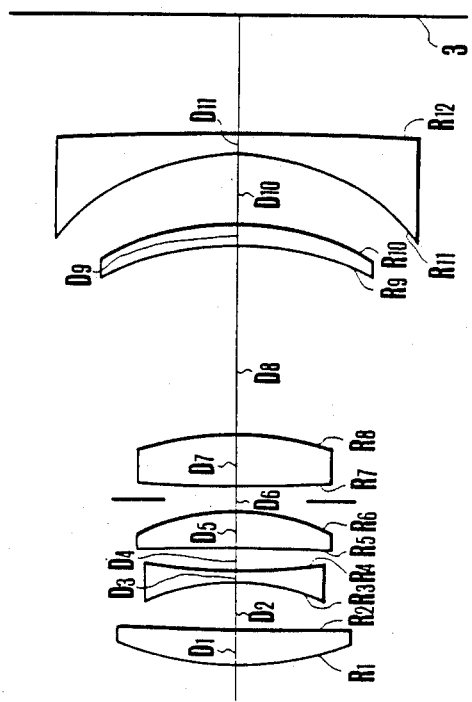
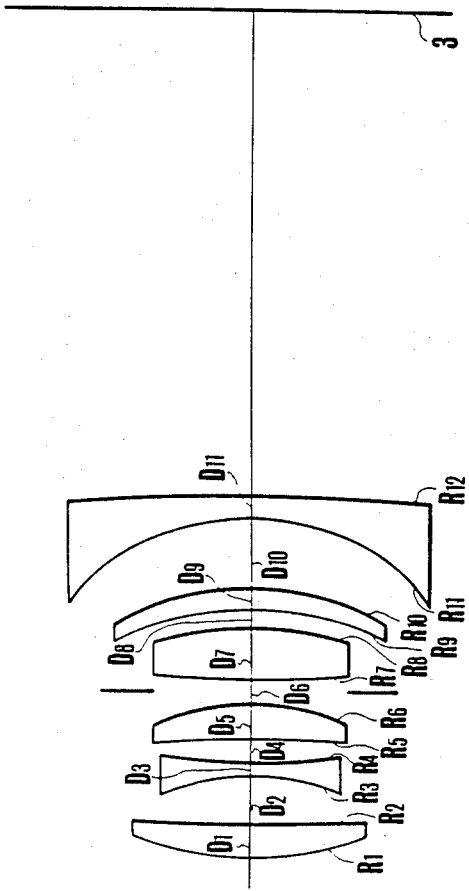
FIG.7A
FIG.7B

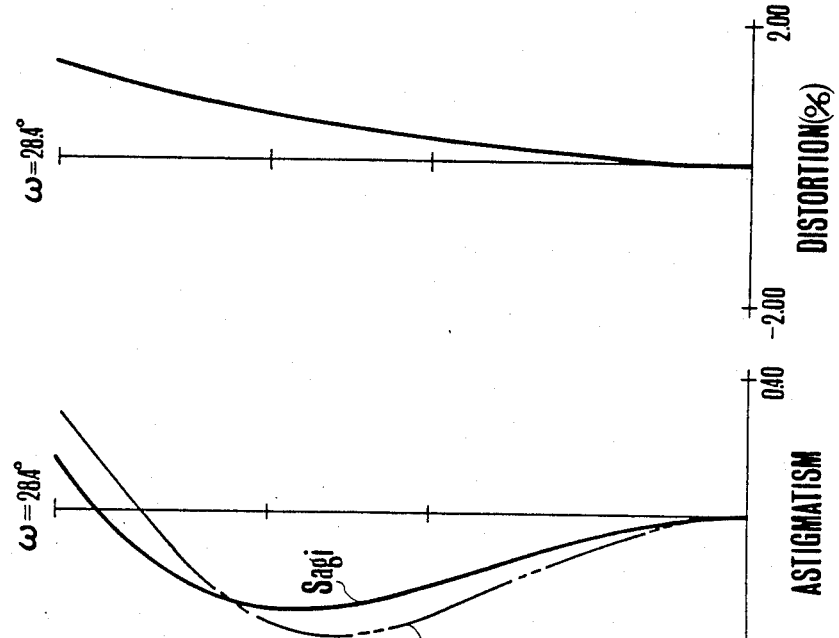

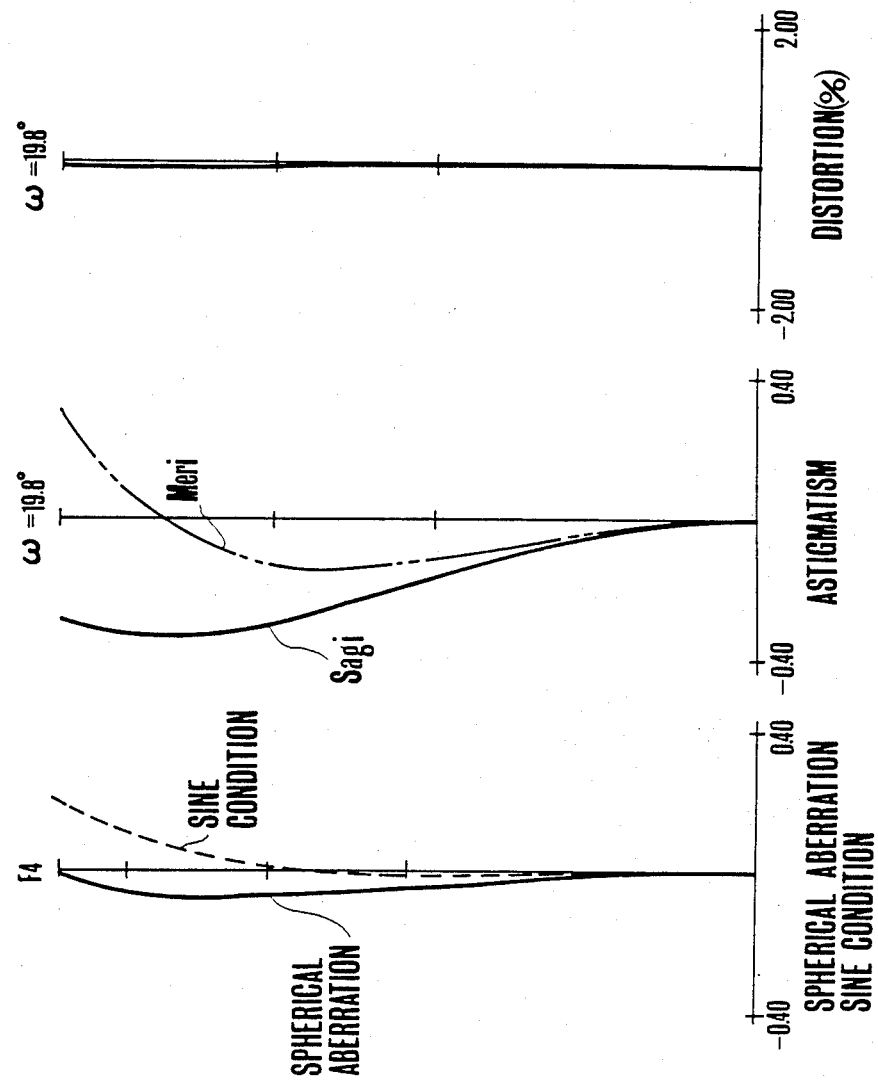

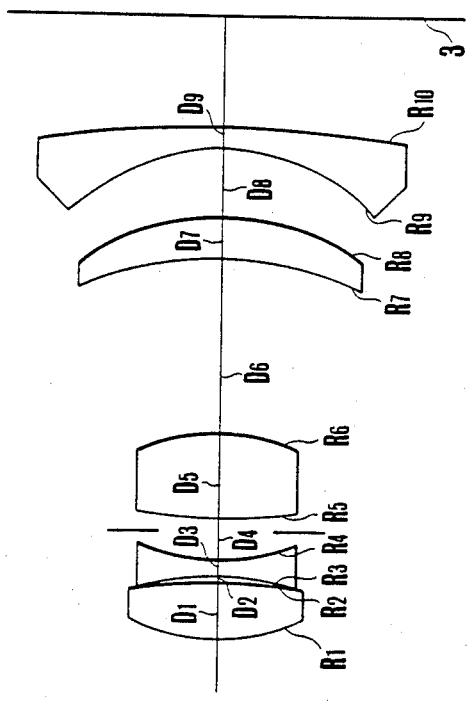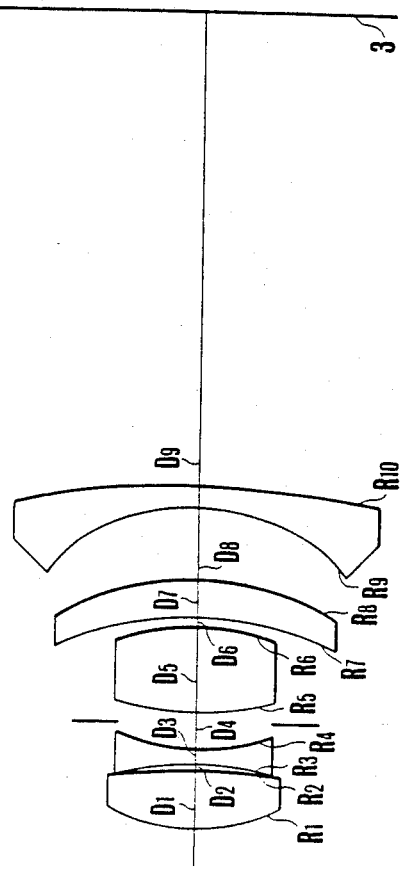
FIG.9A
FIG.9B

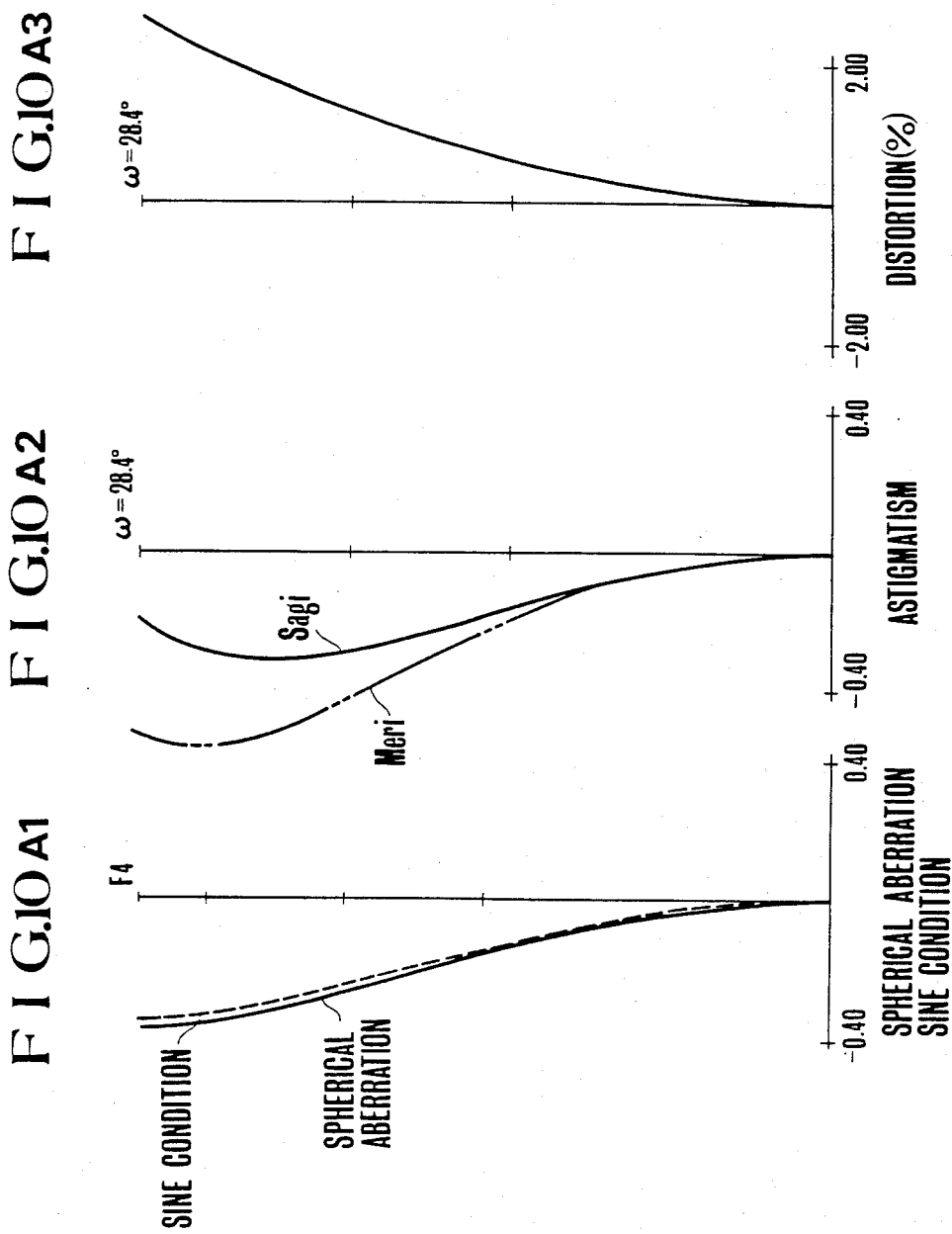

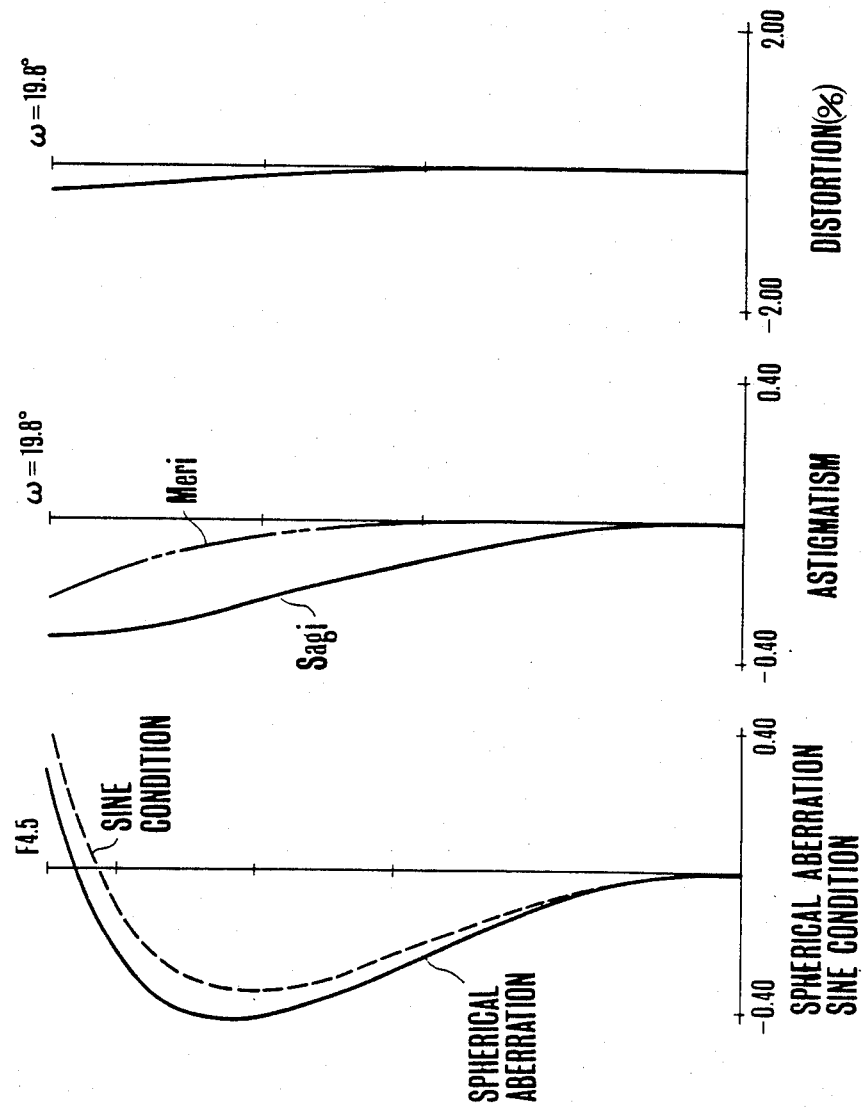

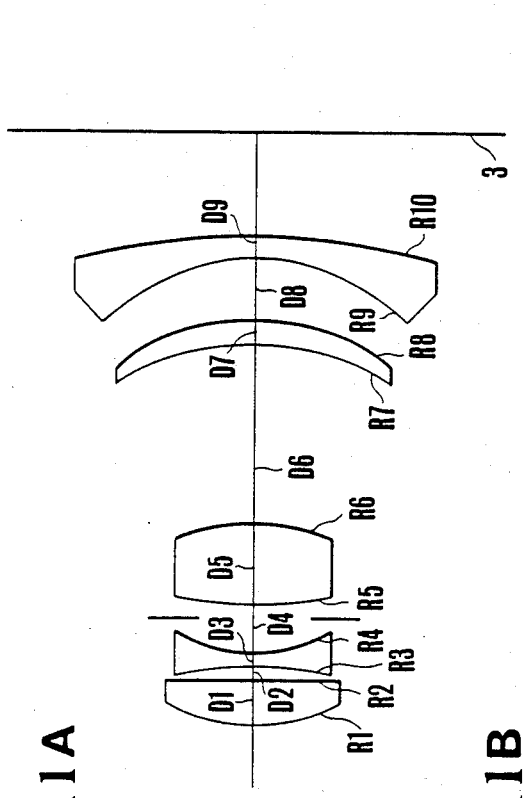
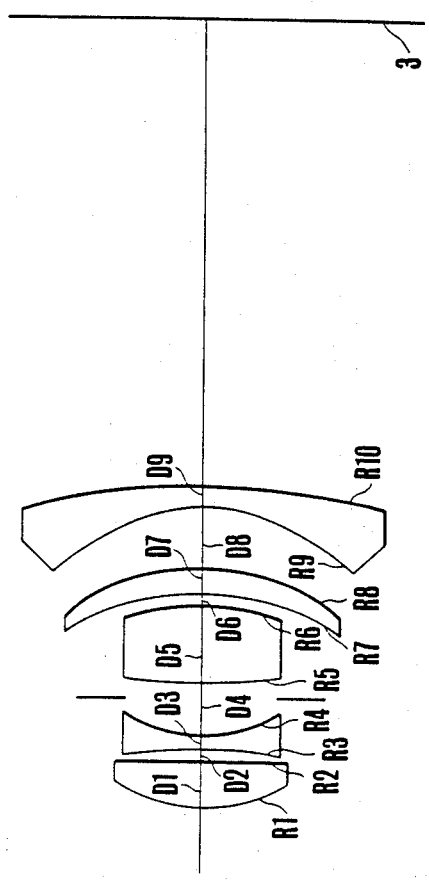
FIG. 11A
FIG. 11B

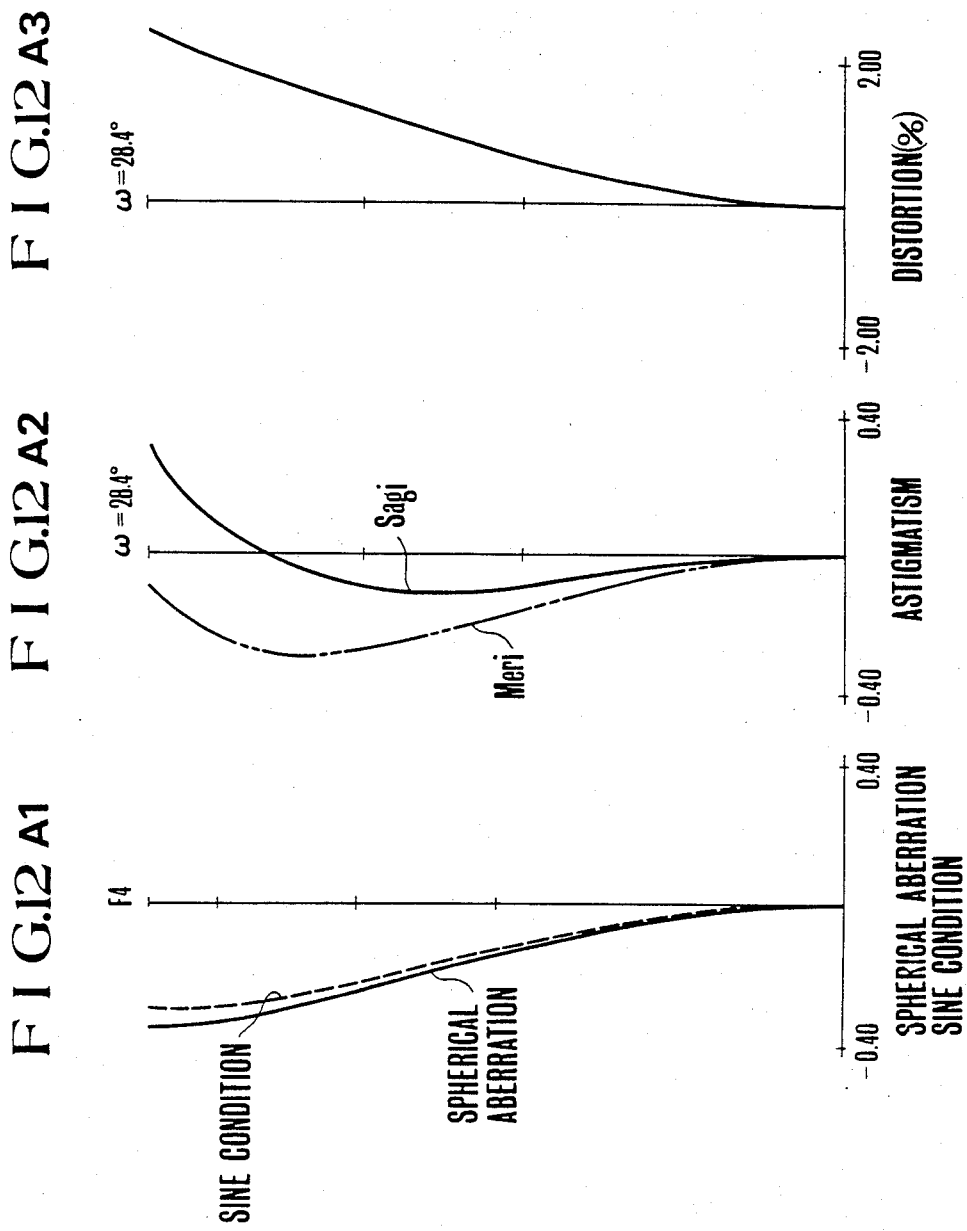

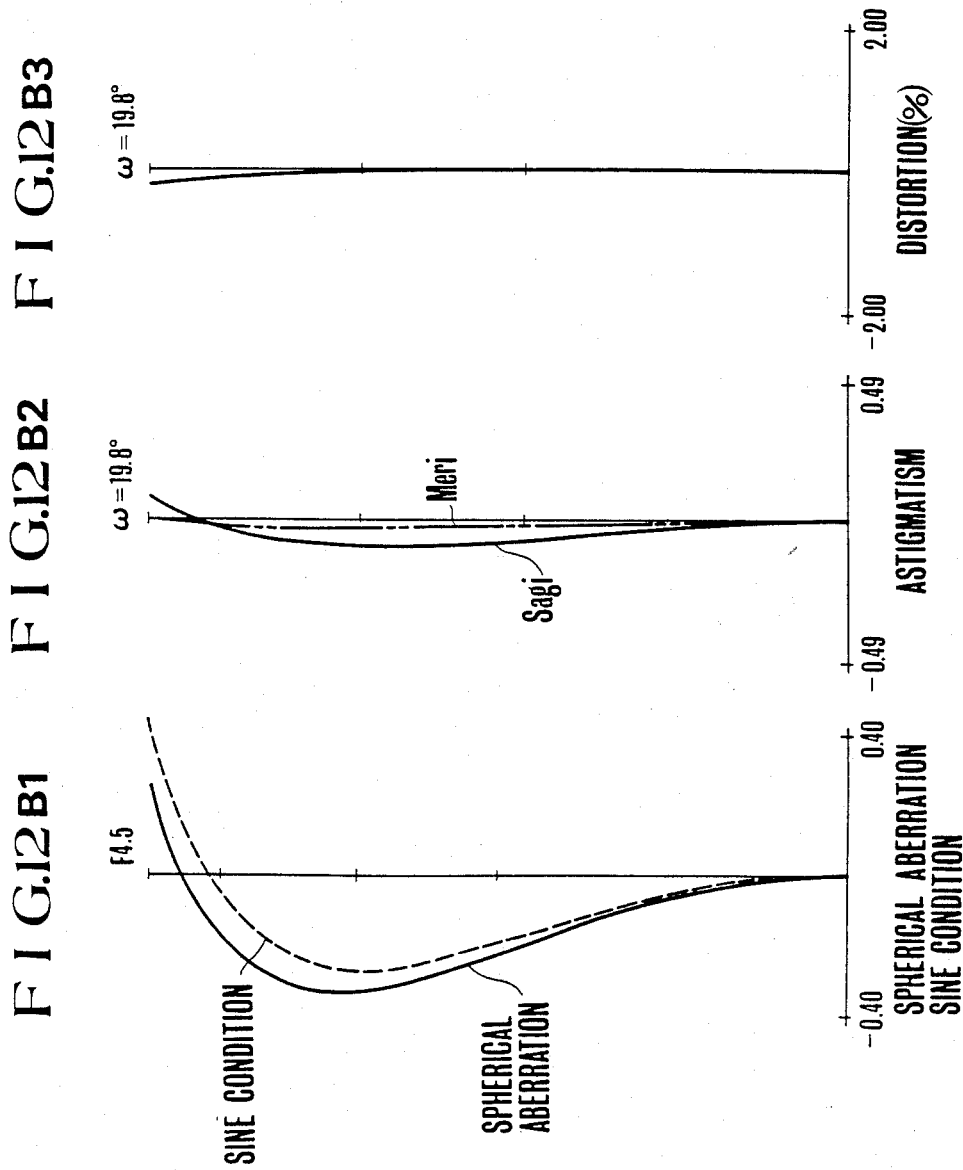

ULTRASMALL SIZE ZOOM LENS

This is a continuation of application Ser. No. 381,463, filed May 24, 1982 now abandoned, as well as a continuation-in-part of application Ser. No. 550,998, filed Nov. 10, 1983, now abandoned, which in turn is a continuation of Ser. No. 243,209, filed Mar. 12, 1981, now abandoned.

BACKGROUND OF THE INVENTION

1. Field of the Invention

This invention relates to two-component zoom objectives suitable for use in photographic devices of the lens shutter type or the like.

2. Description of the Prior Art

In photographic objectives for still cameras a wide acceptance has been found by zoom lenses having a range on the order of 1.5 to 2.0. Most of these zoom lenses are comprised of two components of negative and positive powers counting from the front and are so-called short zooms. Of these short zooms there are known, for example, Japanese Laid Open Patents Nos. Sho 53-91756, Sho 52-153752, Sho 52-152250, Sho 52-26236, Sho 49-29146, Sho 53-60656 and Sho 53-60246. Further, as an advanced form of this type zoom lens, it is proposed that the rear component of positive power is divided into two parts which are made movable independently of each other for the zooming purpose with an advantage that the zooming range is extended, or the bulk and size of the lens system is minimized, as, for example, in Japanese Laid Open Patent Application Nos. Sho 54-26754, Sho 53-103753 and Sho 53-34539 and U.S. Pat. No. 3,771,853.

The above-described types of zoom lenses has so long a back focus as to be generally used with a single lens reflex camera that is equipped with a mirror constituting part of a finder system in a space between the rear vertex of the lens and the film plane. Therefore, when this type zoom lens is attached to a lens shutter camera which does not necessitate the arrangement of any particular optical element in the space between the lens and the film plane, because of its having such long back focus as has been mentioned above, though the lens system itself is of not so much large size, it is unavoidable to result in the camera of large bulk and size as a whole.

SUMMARY OF THE INVENTION

An object of the present invention is to provide a zoom lens for use in a lens shutter type camera which facilitates a minimization of the bulk and size of the camera as a whole.

Another object of the present invention is to provide a zoom lens system with its back focus shortened and the total length of the lens system itself also amenable to minimizing techniques.

Still another object of the present invention is to provide a zoom lens system of simple construction while nevertheless the various aberrations are well corrected throughout the zooming range.

To accomplish the above-described objects, according to the present invention, the zoom lens is constructed by a first component of positive power and a second component of negative power arranged in this order from the front with the axial separation between these components made variable for zooming purposes.

As for the good state of aberration correction, the zoom lens of the invention is provided for the front or first component with two or more positive elements and one or more negative element or elements and for the rear or second component with one or more positive element or elements and one or more negative element or elements.

BRIEF DESCRIPTION OF THE DRAWINGS

FIGS. 4(A1) to (A3) show the various aberrations of the lens of FIG. 3(A).

FIGS. 4(B1) to (B3) show the various aberrations of the lens of FIG. 3(B).

FIGS. 6(A1) to (A3) show the various aberrations of the lens of FIG. 5(A).

FIGS. 6(B1) to (B3) show the various aberrations of the lens of FIG. 5(B).

FIGS. 7(A) and 7(B) are longitudinal sectional views of a third embodiment of a zoom lens according to the present invention in wide angle and telephoto settings.

FIGS. 8(A1) to (A3) show the various aberrations of the lens of FIG. 7(A).

FIGS. 8(B1) to (B3) show the various aberrations of the lens of FIG. 7(B).

FIGS. 9(A) and 9(B) are longitudinal sectional views of a fourth embodiment of a zoom lens according to the present invention in wide angle and telephoto settings.

FIGS. 10(A1) to (A3) show the various aberrations of the lens of FIG. 9(A).

FIGS. 10(B1) to (B3) show the various aberrations of the lens of FIG. 9(B).

FIGS. 11(A) and 11(B) are longitudinal sectional views of a fifth embodiment of a zoom lens according to the present invention in wide angle and telephoto settings.

FIGS. 12(A1) to (A3) show the various aberrations of the lens of FIG. 11(A).

FIGS. 12(B1) to (B3) show the various aberrations of the lens of FIG. 11(B).

DETAILED DESCRIPTION OF THE PREFERRED EMBODIMENTS

Figure 1:
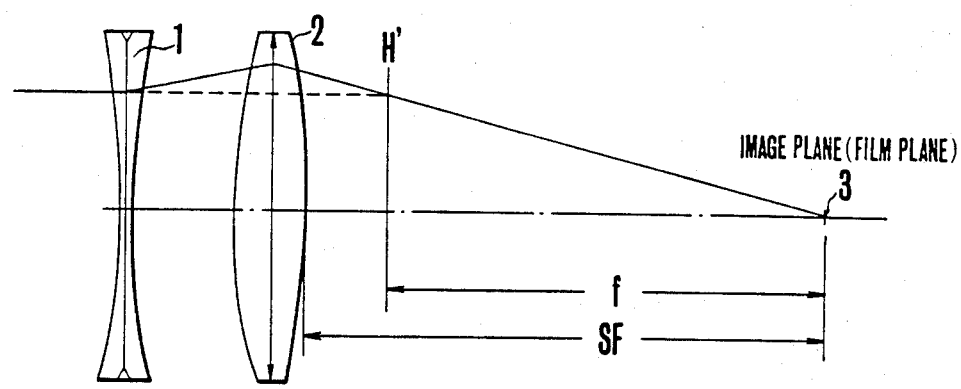
FIG. 1 is a schematic view of a short zoom lens according to the prior art.
Figure 2:
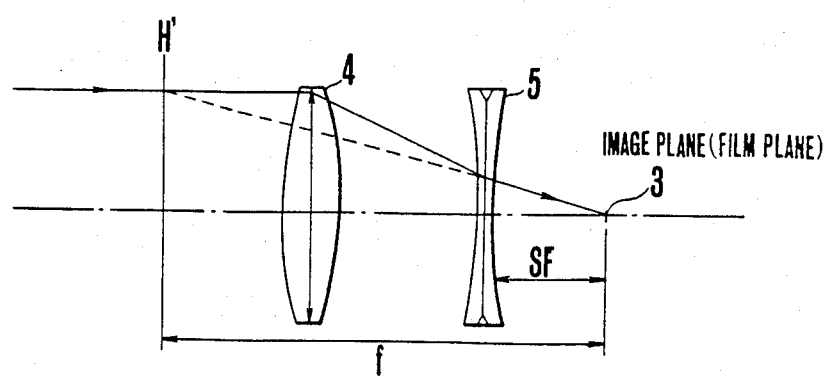
FIG. 2 is a schematic view of a zoom lens of the invention.

FIG. 1 shows the outline of the construction of the conventional short zoom lens, and FIG. 2 shows the outline of the construction of the zoom lens of the present invention. Using FIGS. 1 and 2, the reason why the zoom lens of the invention is advantageous to a minimization of the bulk and size thereof from the constructional standpoint will be explained below. Since, as shown in FIG. 1, the short zoom lens according to the prior art is imparted with negative power at the front component 1 and with positive power at the rear component 2, the rear principal plane H' of the entire system takes its place rearwardly of the second positive lens component 2 to the image plane 3. Therefore, the back focus SF is made longer than the focal length f of the entire system. It follows that the short zoom lens is suited for use in a single lens reflex camera which is equipped with a mirror to pick up a finder image forming light beam in a space between the last lens surface and the image plane.

In the zoom lens of the invention shown in FIG. 2, the arrangement is such that the positive first lens component 4 is followed by the negative second lens component 5. Therefore, the rear principal plane H' of the entire system is brought to a position ahead of the first lens component 4 with the result that the back focus SF is remarkably shortened as compared with the focal length f of the entire system, and the last surface of the second lens component 5 nears the film plane 3. Thus, the zoom lens of the invention has a far shorter total length (from the front vertex to the image plane) than that of the conventional short zoom lens of an equivalent focal length. And, in the zoom lens of the invention, the axial air separation between the positive first and negative second components counting from the front is made variable to effect zooming.

Another feature of the zoom lens of the invention is that the first component of positive power has at least two positive elements and at least one negative element, and the second component of negative power has at least one positive element and at least one negative element. The construction of the first and second components from such combinations of positive and negative elements assists in stabilizing the variation of the various aberrations particularly regarding the spherical aberration, field curvature and coma during the zooming.

Particularly, the aberration can be corrected satisfactorily by arranging at least one positive lens on both the object side and the image side of the negative lens included in the first lens group, and the aberration of the whole picture can be corrected satisfactorily by arranging on the object side of the second lens group, a positive lens having a convex surface directed toward the object side, and arranging on the image side of the second lens group, a meniscus negative lens having a convex surface directed toward the image side.

In the zoom objective of the invention, the 1st lens group of positive refractive power has at least two positive lenses and at least one negative lens, and the 2nd lens group of negative refractive power has at least one positive lens and at least one negative lens, the form and arrangement and construction of the lens elements which constitute the 1st and 2nd lens groups being such that there is arranged on each of the object and image sides of the negative lens which exits at least one in number within the aforesaid 1st lens group at least one positive lens, and that within the aforesaid 2nd lens group the frontmost lens is in the form of a positive lens with its rear surface of convex curvature toward the rear, and the rearmost lens in the form of a meniscus-shaped negative lens convex toward the rear.

By adopting such lens design, it is made possible to maintain a high standard of correction of the various aberrations and particularly spherical aberration, field curvature and coma throughout the zooming range.

In more detail, the 1st lens group is made up of a refractive power distribution of the positive, negative and positive portions, thereby the negative longitudinal chromatic aberration and positive lateral chromatic aberration produced from the positive lenses can be corrected by the negative lens, and the negative spherical aberration and coma produced from the positive lenses can similarly be corrected by the negative lens. Further, astigmatism and field curvature are corrected by the positive and negative lenses. It will be appreciated that the features of the invention provide a possibility of well correcting many of the various aberrations within the 1st lens group.

In the 2nd lens group, the paraxial ray of light incident upon the frontmost lens surface is at a maximum height and spherical aberration representing the paraxial characteristics is introduced by configuring the rear surface of the frontmost positive lens element to a convex shape, thus cancelling the residual aberration of the 1st lens group. Also, the height of incidence of the principal ray of light reaches a maximum at the rearmost lens element. On this account, the rearmost lens element is constructed in the form of a meniscus-shaped negative lens of rearward convexity, thereby the off-axis characteristics such as coma, astigmatism and field curvature are well corrected. Also the use of the positive and negative lenses, each of which is at least one in number, provides good correction of chromatic aberrations too.

It is to be noted that focusing of the zoom objective of the invention may be performing either by moving the lens system as a whole, or by imparting independent movement into either the 1st lens group, or the 2nd lens group.

Figure 3A:
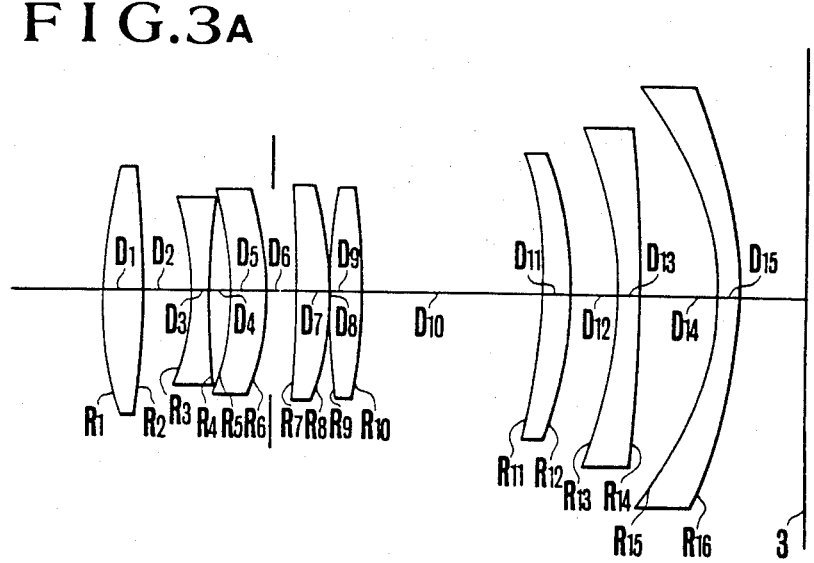
FIGS. 3(A) and 3(B) are longitudinal sectional views of a first embodiment of a zoom lens according to the present invention in wide angle and telephoto settings.
Figure 3B:
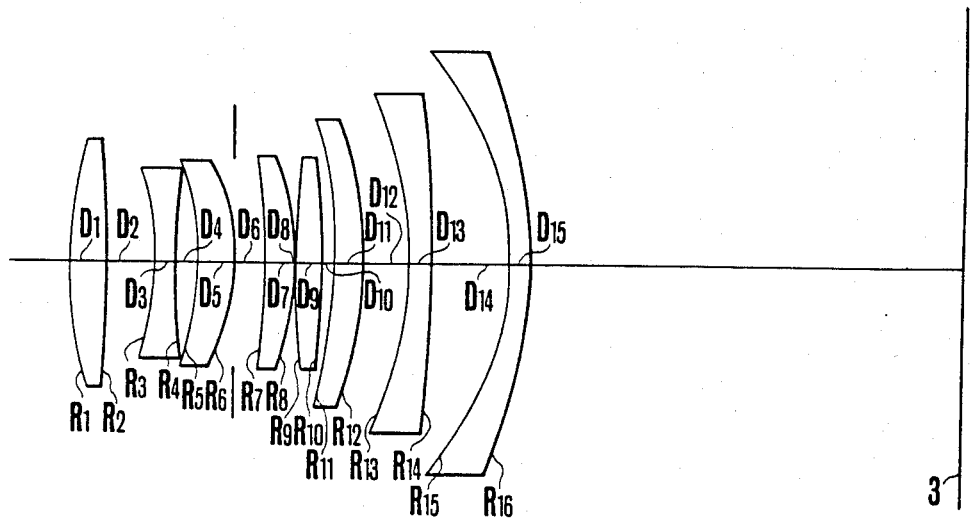
Figure 5A:
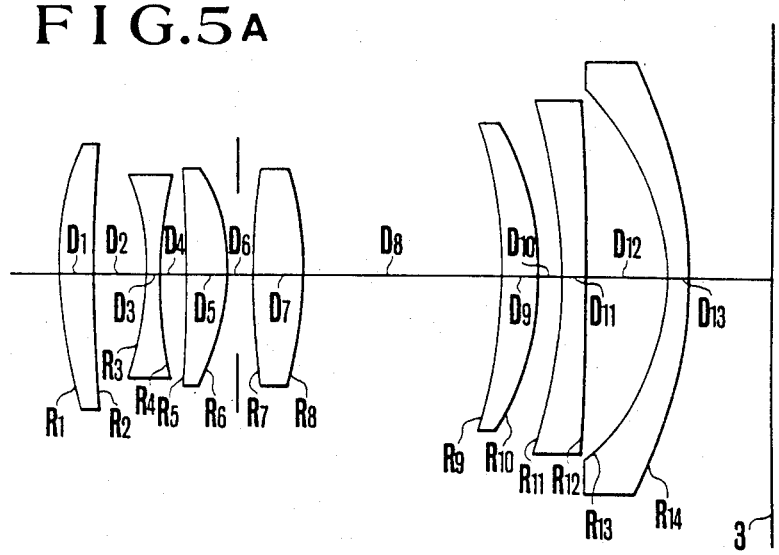
FIGS. 5(A) and 5(B) are longitudinal sectional views of a second embodiment of a zoom lens according to the present invention in wide angle and telephoto settings.
Figure 5B:
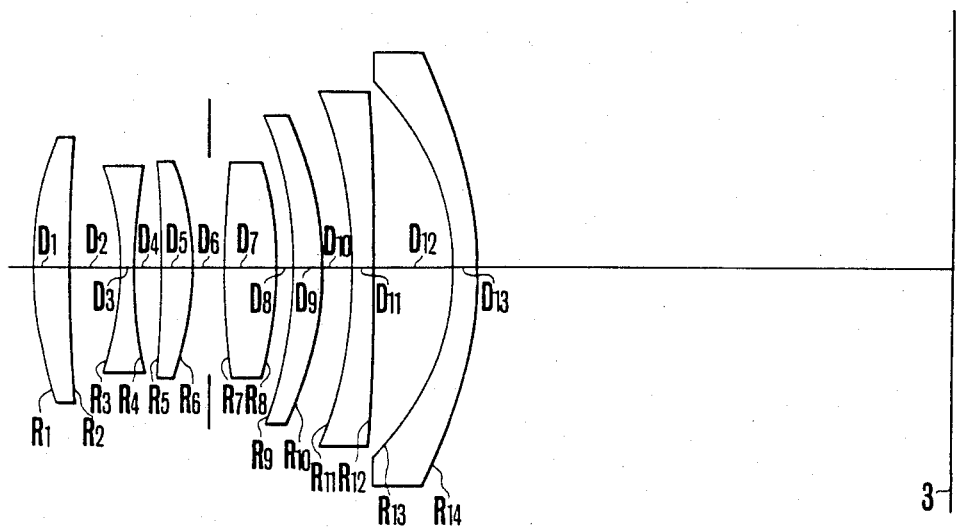

In the following, five different examples of specific zoom lenses of the invention are shown. It is noted that FIG. 3(A) is a lens block diagram of Example 1 in the wide angle position and FIG. 3(B) is a lens block diagram of Example 1 in the telephoto position along with the various aberrations (spherical aberration, sine condition, astigmatism and distortion) of the lens in the two positions at FIGS. 4(A) and 4(B) respectively; FIGS. 5(A) and 5(B) are lens block diagrams of Example 2 in the two positions along with the various aberrations of the lens at FIGS. 6(A) and 6(B) respectively; FIGS. 7(A) and 7(B) are lens block diagrams of Example 3 in the two positions along with the various aberrations at FIGS. 8(A) and 8(B) respectively; FIGS. 9(A) and 9(B) are lens block diagrams of Example 4 along with the various aberrations of the lens at FIGS. 10(A) and 10(B); and FIGS. 11(A) and 11(B) are lens block diagrams of Example 5 in the two positions along with the various aberrations at FIGS. 12(A) and 12(B) respectively.

The following numerical data are given for the radii of curvature of the lens surfaces, R, the axial thicknesses and air separations between the successive lens surfaces, D, the Abbe numbers of the glasses, $v$, and the refractive indices of the glasses N.

EXAMPLE 1

| (FIGS. 3(A) and 3(B), FIGS. 4(A1)–(A3) and 4(B1)–(B3)) | | | | |
|---|---|---|---|---|
| Surface No. | R | D | $v$ | N |
| 1 | 29.848 | 3.000 | 35.7 | 1.62588 |
| 2 | −156.733 | 4.114 | | 1. |
| 3 | −20.564 | 1.623 | 25.4 | 1.80518 |
| 4 | 126.036 | 1.500 | | 1. |
| 5 | −25.326 | 3.000 | 60.7 | 1.60311 |
| 6 | −18.917 | 2.465 | | 1. |
| 7 | −108.301 | 2.473 | 60.7 | 1.60311 |
| 8 | −27.153 | 0.085 | | 1. |
| 9 | 71.705 | 2.448 | 60.7 | 1.60311 |
| 10 | −55.851 | Variable | | 1. |
| 11 | −43.935 | 2.618 | 27.5 | 1.75520 |
| 12 | −27.477 | 3.689 | | 1. |
| 13 | −28.851 | 1.445 | 50.9 | 1.65844 |
| 14 | −214.464 | 6.638 | | 1. |

-continued

| (FIGS. 3(A) and 3(B), FIGS. 4(A1)-(A3) and 4(B1)-(B3)) | | | |
|---|---|---|---|
| 15 | −23.055 | 1.615 | 41.1 | 1.70154 |
| 16 | −37.823 | | | 1. |

| Focal Length | D10 |
|---|---|
| 40 | 14.5511 |
| 60 | 0.7736 |

EXAMPLE 2

(FIGS. 5(A), (B), FIGS. 6(A1)-(A3), (B1)-(B3))

| Surface No. | R | D | ν | N |
|---|---|---|---|---|
| 1 | 25.329 | 2.794 | 27.8 | 1.74077 |
| 2 | 145.604 | 3.979 | | 1. |
| 3 | −20.508 | 1.077 | 25.4 | 1.80518 |
| 4 | 49.823 | 1.790 | | 1. |
| 5 | −93.361 | 2.778 | 60.7 | 1.60311 |
| 6 | −18.242 | 2.000 | | 1. |
| 7 | 66.586 | 3.785 | 60.7 | 1.60311 |
| 8 | −29.556 | Variable | | 1. |
| 9 | −35.998 | 2.387 | 25.7 | 1.78472 |
| 10 | −24.588 | 2.161 | | 1. |
| 11 | −37.578 | 1.445 | 60.7 | 1.60311 |
| 12 | −429.751 | 6.191 | | 1. |
| 13 | −18.269 | 1.615 | 41.1 | 1.70154 |
| 14 | −32.578 | | | 1. |

| Focal Length | D8 |
|---|---|
| 40 | 14.947 |
| 60 | 1.170 |

EXAMPLE 3

(FIGS. 7(A), (B), FIGS. 8(A1)-(A3), (B1)-(B3))

| Surface No. | R | D | ν | N |
|---|---|---|---|---|
| 1 | 26.414 | 2.804 | 27.80 | 1.74077 |
| 2 | 264.624 | 3.773 | | 1. |
| 3 | −19.878 | 1.077 | 25.40 | 1.80518 |
| 4 | 46.025 | 1.770 | | 1. |
| 5 | −286.846 | 2.960 | 60.70 | 1.60311 |
| 6 | −18.571 | 2.000 | | 1. |
| 7 | 112.431 | 4.101 | 60.70 | 1.60311 |
| 8 | −27.505 | Variable | | 1. |
| 9 | −26.424 | 1.941 | 25.40 | 1.80518 |
| 10 | −21.151 | 5.656 | | 1. |
| 11 | −18.807 | 1.445 | 60.70 | 1.60311 |
| 12 | −245.004 | | | 1. |

| Focal Length | D8 |
|---|---|
| 40 | 15.288 |
| 60 | 1.511 |

EXAMPLE 4

(FIGS. 9(A), (B), FIGS. 10(A1)-(A3), (B1)-(B3))

| Surface No. | R | D | ν | N |
|---|---|---|---|---|
| 1 | 15.757 | 4.458 | 27.80 | 1.74077 |
| 2 | −98.135 | 0.522 | | 1. |
| 3 | −32.722 | 1.077 | 25.40 | 1.80518 |
| 4 | 14.045 | 3.579 | | 1. |
| 5 | 36.074 | 6.847 | 60.70 | 1.60311 |
| 6 | −17.744 | Variable | | 1. |
| 7 | −26.408 | 3.256 | 25.70 | 1.78472 |
| 8 | −20.186 | 5.407 | | 1. |
| 9 | −17.427 | 1.615 | 41.10 | 1.70154 |
| 10 | −84.051 | | | 1. |

-continued (FIGS. 9(A), (B), FIGS. 10(A1)-(A3), (B1)-(B3))

| Focal Length | D6 |
|---|---|
| 40 | 14.612 |
| 60 | 0.835 |

EXAMPLE 5

(FIGS. 11(A), (B), FIGS. 12(A1)-(A3), (B1)-(B3))

| Surface No. | R | D | ν | N |
|---|---|---|---|---|
| 1 | 14.834 | 3.510 | 40.2 | 1.76200 |
| 2 | 424.573 | 0.977 | | 1. |
| 3 | −41.136 | 1.077 | 31.1 | 1.68893 |
| 4 | 12.368 | 4.037 | | 1. |
| 5 | 35.368 | 6.520 | 61.2 | 1.55963 |
| 6 | −17.933 | Variable | | 1. |
| 7 | −21.712 | 2.086 | 25.7 | 1.78472 |
| 8 | −17.812 | 4.982 | | 1. |
| 9 | −17.042 | 1.615 | 41.1 | 1.70154 |
| 10 | −65.698 | | | 1. |

| Focal Length | D6 |
|---|---|
| 40 | 14.645 |
| 60 | 0.868 |

What is claimed is:

1. A photographic zoom lens of ultrashort total length comprising:
    a first lens group having a positive refractive power and positioned at the object side of the zoom lens;
    a second lens group having a negative refractive power and positioned closer to the image side than the first lens group, said object side being the long conjugate and said image side being the short conjugate;
    an air separation between said first lens group and said second lens group, said air separation being variable to effect zooming;
    said first lens group having at least two positive lenses and at least one negative lens;
    said second lens group having at least one positive lens and at least one negative lens; and
    both said first lens group and said second lens group being arranged for moving toward the object side during zooming from the wide angle end to the telephoto end.

2. A photographic zoom lens of ultrashort total length as in claim 1, wherein said first lens group has at least one positive lens on each of the object and image sides of said negative lens which is at least one in number.

3. A photographic zoom lens of ultrashort total length as in claim 1, wherein said second lens group has an object-side lens of positive power with its rear surface of convex curvature.

4. A photographic zoom lens of ultrashort total length as in claim 1, wherein said second lens groups has an image-side lens in negative meniscus form with its rear surface of convex curvature.

5. A photographic zoom lens of ultrashort total length comprising:
    a first lens group having a positive refractive power;
    a second lens group having a negative refractive power;

an air separation between said first lens group and said second lens group being made variable to effect zooming;

said first lens group having at least one negative lens, and at least one positive lens respectively on the object side and the image side of said negative lens;

said second lens group having at least one positive lens and at least one negative lens;

the lens on the object side of the second lens group being a positive lens having a convex surface directed toward the image, said object side being the long conjugate;

the lens on the image side of the second lens group being a meniscus negative lens having a convex surface directed to the image, and said zoom lens having a back focus longer than 0, said image side being the short conjugate; and both said first lens group and said second lens group being arranged for moving toward the object side during zooming from the wide angle end to the telephoto end.

6. A compact photographic lens comprising:

a first lens group and a second lens group arranged from front to rear with an air separation between the two lens groups, the lenses being arranged so that the air separation between the lens groups is variable to effect zooming;

said first lens group facing the object side and having a positive refractive power and having at least two positive lenses and at least one negative lens, and having at least one positive lens on each of the object and image sides of said negative lens;

the second lens group facing the image side and being of negative refractive power, and having at least one positive lens and at least one negative lens, the frontmost lens being a positive lens with its rear surface of convex curvature toward the rear.

7. A photographic zoom lens according to claim 6, wherein the rearmost lens in said second lens group is a meniscus-shaped negative lens of rearward convexity.

8. A compact photographic lens comprising:

first and second lens groups arranged from front to rear with an air separation between the two lens groups, said lens groups being arranged so that the air separation between the lens groups is variable to effect zooming;

said first lens group facing the object side and being of positive refractive power and having at least two positive lenses and at least one negative lens, and having at least one positive lens on each of the object and image sides of one negative lens among said negative lenses; and said second lens group facing the image side and being of negative refractive power, and having at least one positive lens and at least one negative lens, the frontmost lens being a positive lens with its rear surface of convex curvature toward the rear, and the rearmost lens being a meniscus-shaped negative lens of rearward convexity.

* * * * *